No. 851,716. PATENTED APR. 30, 1907.
O. H. & F. H. VOELKERDING.
ANIMAL TRAP.
APPLICATION FILED MAY 14, 1906.
2 SHEETS—SHEET 2.
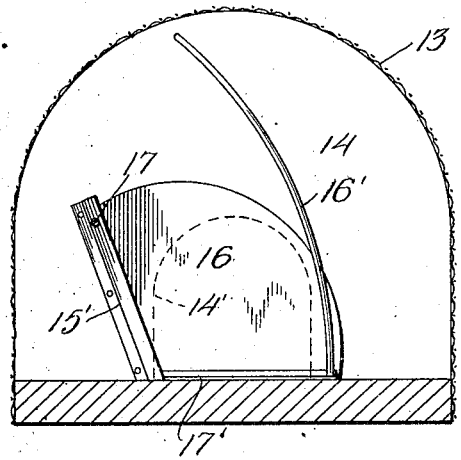
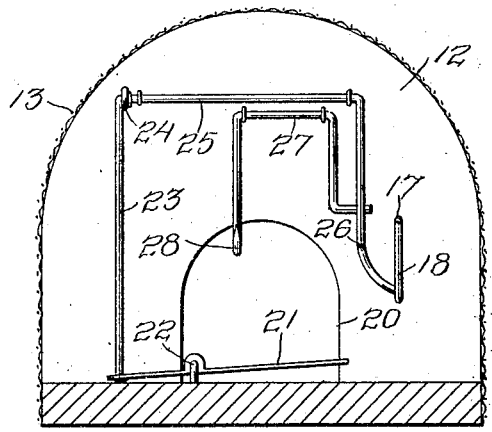
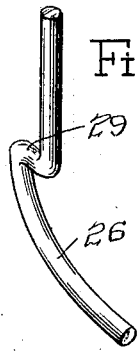
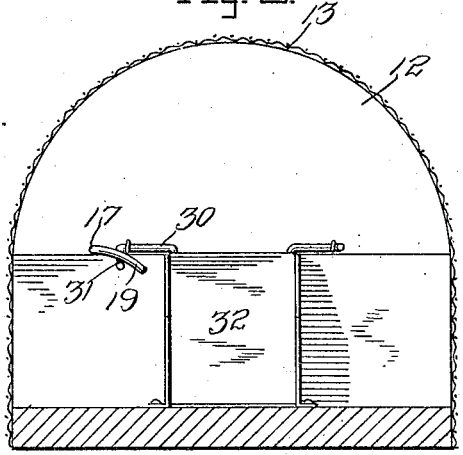

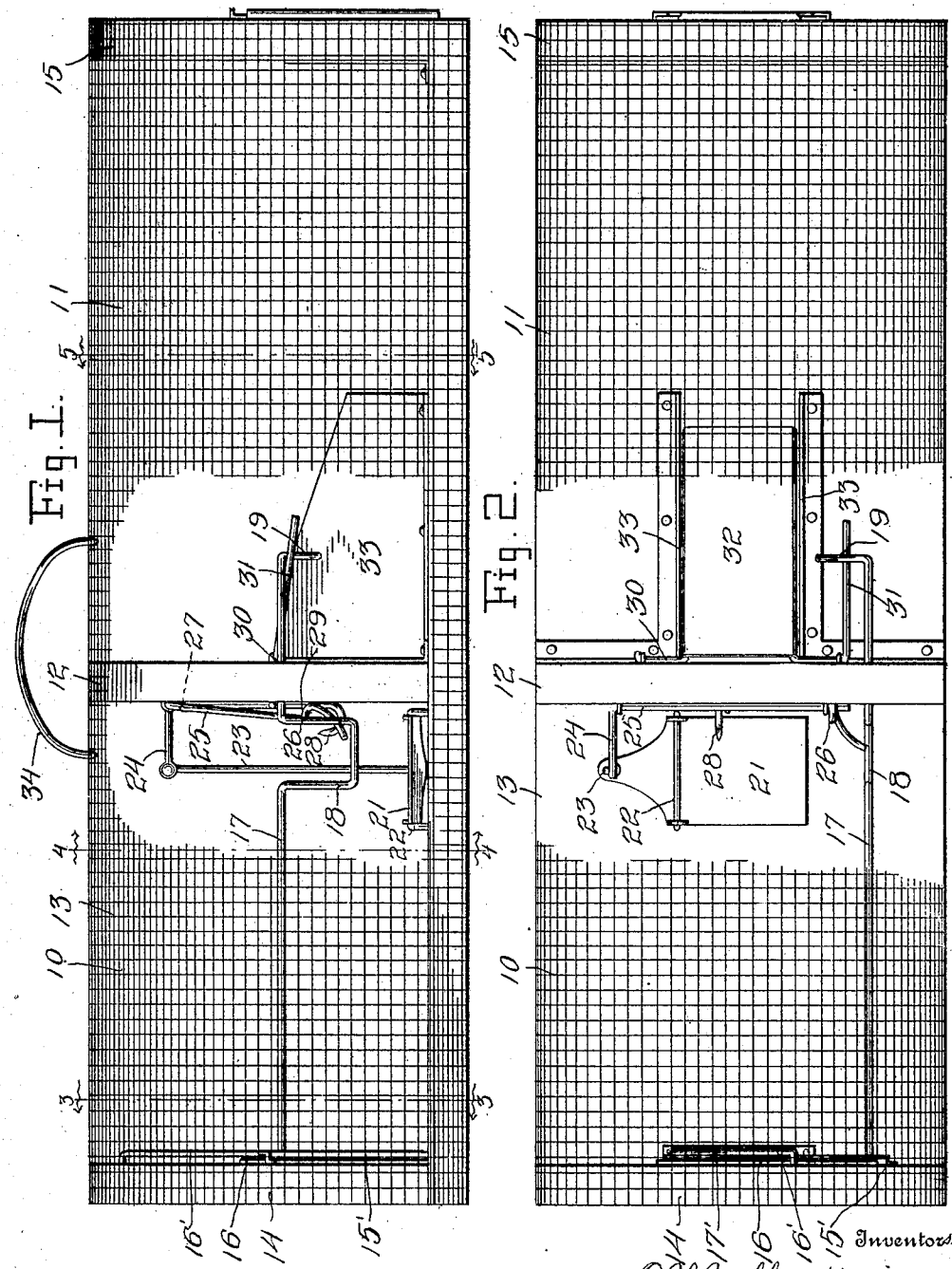

UNITED STATES PATENT OFFICE.

OTTO H. VOELKERDING AND FREDERICK H. VOELKERDING, OF DUTZOW, MISSOURI.

ANIMAL-TRAP.

No. 851,716.  Specification of Letters Patent.  Patented April 30, 1907.

Application filed May 14, 1906. Serial No. 316,757.

*To all whom it may concern:*

Be it known that we, OTTO H. VOELKERDING and FREDERICK H. VOELKERDING, citizens of the United States, residing at Dutzow, in the county of Warren, State of Missouri, have invented certain new and useful Improvements in Animal-Traps; and we do hereby declare the following to be a full, clear, and exact description of the invention, such as will enable others skilled in the art to which it appertains to make and use the same.

This invention relates to animal traps and in particular to that type which comprises a catching chamber, a communicating collecting chamber, and a device located at the point of communication between the two chambers which the weight of the animal is adapted to trip lowering the entrance door of the former chamber, the entry of the animal into the collecting chamber acting to automatically raise and set said door.

The particular improvements consist in the construction of the trip and of the crank shaft connected with the trip for raising and setting the entrance door of the trap.

With this end in view, the invention consists in the construction, combination and arrangement of parts, all as hereinafter fully described, specifically pointed out in the claims and illustrated in the accompanying drawings, in which Figure 1 is a front elevation of a trap constructed in accordance with this invention, the wire casing being partly broken away. Fig. 2 is a similar top plan view. Figs. 3, 4 and 5 are transverse vertical sections on the lines 3—3, 4—4 and 5—5, respectively of Fig. 1. Fig. 6 is an enlarged detailed perspective view of the setting rod.

Like parts are designated by similar reference numerals in the several views.

Referring to the drawings, the trap is shown as comprising a catching chamber 10 and a collecting chamber 11, formed by the provision of a vertical partition plate 12 upon the bottom plate of the trap, the entire device being inclosed by a wire casing 13 attached to the bottom plate partition, and end plates, as shown.

In practice, the partition plate, end plates, and bottom are solid, and may be formed of wood, tin or other material, as preferred.

The partition plate is located somewhat nearer the front end plate 14 than to the rear end plate 15, resulting in the formation of the catching chamber of less extent than the collecting chamber, so that the animal entrapped in the former, will, of its own accord, readily enter the latter. The front end plate 14 has an opening 14' therein, closed by a door 16 of sector shape, pivoted at its upper end to a rock shaft 17 journaled in said end plate and the partition plate 12, said door sliding in guides 15' and 16', attached to the inner face of said end plate, the former of said guides serving to limit the downward movement of said door, there being also a third guide 17', attached to the bottom plate of the trap, and extending upwardly a slight distance therefrom to prevent the trapped animal from raising the door by inserting its claws thereunder. The rock shaft 17 is bent adjacent the front face of the partition plate, as shown at 18 to form a latch, the rear end of said shaft extending through said plate and being bent inwardly at right angles to its axis as at 19, and at a slight downward curve, as shown.

Located in the catching chamber, adjacent the opening 20 in the partition plate affording the means of communication between the two chambers is a treadle 21 held in place a slight distance above the surface of the bottom plate by a curved pivot bolt 22 passing transversely across said treadle and through the side ears thereon. The larger or platform end of said treadle is located directly opposite the opening 20, while its smaller end is pivotally connected to the lower end of a link 23, the upper end of which is attached in like fashion to the outwardly extended end 24 of a setting rod 25 fastened to the front face of the partition plate directly above the opening therein, the other end of said rod 25 being bent downwardly as shown to form a hook 26. The hook end of said rod is of sufficient length to enable the hook thereon to co-operate with the latch 18, as hereinafter described. A second rod 27 is fastened to the front face of the partition plate in like manner with rod 25, and directly below the same, one end of rod 27 being bent downwardly and forming a bait hook 28 extending in line with the upper portion of opening 20. Rods 25 and 27 are so mounted that both may be swung upwardly, said rods normally resting against the partition plate.

When the entrance door 16 of the catching chamber is swung upwardly, the rock shaft 17, to which said door is connected, will be correspondingly actuated, the latch 18 moving inwardly and upwardly, into contact with the under face of the hooked end 26 of the rod 25, which is bent slightly toward the rock shaft side of the chamber 10 for that purpose. Continued upward movement of the rock shaft will force rod 25 to swing outwardly as the latch 18 moves along its curved under face, until the hook portion is cleared, when the weight of the rod permits it to move backwardly a slight distance thus seating latch 18 upon the shoulder 29 formed thereupon. The platform end of the treadle 21 will, in like manner, be elevated owing to its pivotal connection with rod 25.

The bait is placed upon the bait hook which, as shown, extends directly above the platform end of the treadle, so that it will be impossible for the bait to be reached by an animal in the chamber without stepping on said platform, and thus depressing the platform and elevating the link connecting the treadle and setting rod 25, swinging the latter outwardly until the shoulder 29 on its hooked end is moved from under the latch 18, when the rock-shaft will be free to move downwardly, owing to the weight of the door 16, and the entrance of the catching chamber closed, thus trapping the animal. It will be apparent that even in the event of the failure of the treadle to operate, the same result will be obtained by a mere pull upon the bait-hook, as the depending end thereof, opposite the hook end proper, will move the end 26 of the setting rod 25 forwardly, thus releasing the latch 18 of the rock shaft from engagement therewith, when the rock shaft will be free to move downwardly, closing the door as above described.

Located on the rear face of the partition plate, directly above the opening therein, is a rod 30 fastened thereto in such a manner as to permit a swinging movement thereof, one end 31 of said rod being bent outwardly at right angles to the axis of said rod, and extending beneath the curved extension 19 of the rock shaft 17. Attached to the rod 30 is a door 32 of such length that in its normal or closed position it forms an angle of about 30° with the surface of the bottom plate of the trap with which its lower edge contacts. Located on either side of said door is a guide 33, extending a slight distance above and beyond the same, as shown. The animal on passing through the opening in the partition plate will contact with door 32, raising the same, and since said door is rigidly attached to its rod 30, said rod will in like manner be rocked, thus elevating its bent end 31 into contact with the outer end of the extension 19 of the rock shaft and rocking said shaft, when the entrance door of the catching chamber will be raised, the rock shaft latch caught upon the hook of the setting rod, and the treadle again set in position. When once the animal has entered into the collecting chamber it will be prevented from raising the door 32 and escaping into the catching chamber by the provision of the guides 33, which are located adjacent the side edges of said door and extend above and beyond the same.

The front and rear walls of the collecting chamber, which are usually of wood, are provided with a guard facing of sheet tin or the like to prevent the animals from escaping, and the rear end plate of the trap, which forms said rear wall, is provided with an opening having a door operable from the outside, through which the animals may be allowed to escape when desired. The trap carries a handle 34 connected to the wire casing at its upper portion thereof, by means of which the trap may be carried to the place of use. The trap is primarily adapted to catch rats, mice or rabbits, and its general operation is thought to be apparent from the foregoing, further extended description being therefore deemed unnecessary.

Obvious modifications and changes may be made without departing from the spirit of the invention within the scope of the claims, it being therefore not intended that the invention be limited to the exact details of construction shown and described.

What is claimed, is:—

1. An animal trap having a partition plate dividing the same into a catching chamber and a collecting chamber; said partition plate being provided with an opening forming a means of communication between said chambers; an entrance door to said catching chamber; a rock shaft journaled in said catching chamber and to which said entrance door is pivoted at its upper end; a latch on said shaft adjacent the partition plate; a rod mounted on said partition plate above the opening therein; and provided at one end with a depending hook in the path of the latch on said shaft; a treadle pivoted to the floor of said catching chamber and having connections with the other end of said rod to rock said shaft when said treadle is depressed; a door pivotally mounted in said collecting chamber above the point of communication between said chambers; and means connected to said collecting chamber door adapted to rock said shaft and raise said entrance door when said collecting chamber door is raised.

2. An animal trap comprising bottom and end plates and an inclosing casing; a partition plate connected to said bottom plate and casing and dividing the trap into a catching chamber and a collecting chamber the front end plate and partition plate each being provided with an opening forming a means for entrance to the respective chambers; a rock shaft journaled in said collecting chamber and having its rear end extending into said collecting chamber and provided with an inward bend; a door pivoted at its upper end to said rock shaft to close the entrance opening to said catching chamber; a rod mounted on the rear face of said partition plate and having an inclined door rigidly connected thereto at the point of communication between said chambers; said rod having an outwardly bent end extending directly beneath the bent end of said shaft to rock said shaft when the collecting chamber door is raised and simultaneously raise the catching chamber door; means for retaining said catching chamber door in its rearward position; and means for releasing the same from such position.

3. An animal trap having a partition plate dividing the same into a catching chamber and a collecting chamber, said partition plate being provided with an opening forming a means of communication between said chambers; an entrance door to said catching chamber; a rock shaft journaled in said catching chamber and to which entrance door is secured, said rock shaft having one end extending through said partition plate into the collecting chamber and formed with a lateral inwardly directed bend therein; a treadle pivoted in said catching chamber; connections between said treadle and rock shaft for releasing the latter when said treadle is depressed; an inclined door pivotally secured at its upper end to the rear face of said partition plate above the opening formed therein; a vertical guide mounted in said collecting chamber adjacent each side edge of said last mentioned door, and coöperating therewith to normally close communication between said chambers; and means connected with said collecting chamber door adapted, when said door is raised, to contact with the laterally bent end of said rock shaft, to actuate the latter to elevate the catching chamber door.

In testimony whereof, I affix my signature, in presence of two witnesses.

OTTO H. VOELKERDING.
FREDERICK H. VOELKERDING.

Witnesses.
  GEO. H. BOCKLAGE,
  A. C. HASENYAEGER